US008799269B2

(12) United States Patent
Friedlander et al.

(10) Patent No.: US 8,799,269 B2
(45) Date of Patent: Aug. 5, 2014

(54) OPTIMIZING MAP/REDUCE SEARCHES BY USING SYNTHETIC EVENTS

(75) Inventors: Robert R. Friedlander, Southbury, CT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 13/342,406

(22) Filed: Jan. 3, 2012

(65) Prior Publication Data
US 2013/0173585 A1 Jul. 4, 2013

(51) Int. Cl.
*G06F 7/00* (2006.01)
*G06F 17/30* (2006.01)

(52) U.S. Cl.
USPC ........... 707/713; 707/738; 707/750; 707/727; 707/770; 707/741

(58) Field of Classification Search
CPC ........................ G06F 17/30864; G06F 17/2211
USPC .......................................................... 707/713
See application file for complete search history.

(56) References Cited

U.S. PATENT DOCUMENTS

| 5,664,179 | A | 9/1997 | Tucker |
| 5,689,620 | A | 11/1997 | Kopec et al. |
| 5,701,460 | A | 12/1997 | Kaplan et al. |
| 5,974,427 | A * | 10/1999 | Reiter .................................. 1/1 |
| 6,199,064 | B1 | 3/2001 | Schindler |
| 6,275,833 | B1 | 8/2001 | Nakamura et al. |
| 6,314,555 | B1 | 11/2001 | Ndumu et al. |
| 6,334,156 | B1 | 12/2001 | Matsuoka et al. |
| 6,553,371 | B2 | 4/2003 | Gutierrez-Rivas et al. |
| 6,633,868 | B1 | 10/2003 | Min et al. |
| 6,768,986 | B2 | 7/2004 | Cras et al. |
| 7,058,628 | B1 | 6/2006 | Page |
| 7,337,174 | B1 | 2/2008 | Craig |
| 7,441,264 | B2 | 10/2008 | Himmel et al. |
| 7,523,118 | B2 | 4/2009 | Friedlander et al. |
| 7,523,123 | B2 | 4/2009 | Yang et al. |

(Continued)

FOREIGN PATENT DOCUMENTS

| EP | 1566752 A2 | 8/2005 |
| EP | 1843259 A2 | 10/2007 |
| WO | 2006086179 A2 | 8/2006 |
| WO | 2007044763 A2 | 4/2007 |

OTHER PUBLICATIONS

M.J. Flynn, et al, "Sparse Distributed Memory Principles of Operation", Research Institute for Advanced Computer Science, 1989, pp. 1-60.

(Continued)

*Primary Examiner* — Binh V Ho
(74) *Attorney, Agent, or Firm* — John R. Pivnichny; Law Office of Jim Boice

(57) ABSTRACT

A processor-implemented method, system, and/or computer program product optimizes a search for data from documents. A processor receives an instruction to perform an initial map/reduce search for a specific set of data in documents from a first database. A synthetic event, which is a non-executable descriptor of the specific set of data in documents from the first database, is generated, and a revised map/reduce search for the synthetic event in a second database is conducted. The processor then returns a solution for the revised map/reduce search.

20 Claims, 3 Drawing Sheets

(56) References Cited

U.S. PATENT DOCUMENTS

| | | | |
|---|---|---|---|
| 7,571,163 B2 | 8/2009 | Trask | |
| 7,702,605 B2 | 4/2010 | Friedlander et al. | |
| 7,748,036 B2 | 6/2010 | Speirs, III et al. | |
| 7,752,154 B2 | 7/2010 | Friedlander et al. | |
| 7,778,955 B2 | 8/2010 | Kuji | |
| 7,783,586 B2 | 8/2010 | Friedlander et al. | |
| 7,788,202 B2 | 8/2010 | Friedlander et al. | |
| 7,788,203 B2 | 8/2010 | Friedlander et al. | |
| 7,792,774 B2 | 9/2010 | Friedlander et al. | |
| 7,792,776 B2 | 9/2010 | Friedlander et al. | |
| 7,792,783 B2 | 9/2010 | Friedlander et al. | |
| 7,797,319 B2 | 9/2010 | Piedmonte | |
| 7,805,390 B2 | 9/2010 | Friedlander et al. | |
| 7,805,391 B2 | 9/2010 | Friedlander et al. | |
| 7,809,660 B2 | 10/2010 | Friedlander et al. | |
| 7,853,611 B2 | 12/2010 | Friedlander et al. | |
| 7,870,113 B2 | 1/2011 | Gruenwald | |
| 7,877,682 B2 | 1/2011 | Aegerter | |
| 7,930,262 B2 | 4/2011 | Friedlander et al. | |
| 7,953,686 B2 | 5/2011 | Friedlander et al. | |
| 7,970,759 B2 | 6/2011 | Friedlander et al. | |
| 7,996,393 B1* | 8/2011 | Nanno et al. | 707/723 |
| 8,046,358 B2 | 10/2011 | Thattil | |
| 8,055,603 B2 | 11/2011 | Angell et al. | |
| 8,069,188 B2 | 11/2011 | Larson et al. | |
| 8,086,614 B2 | 12/2011 | Novy | |
| 8,145,582 B2 | 3/2012 | Angell et al. | |
| 8,150,882 B2 | 4/2012 | Meek et al. | |
| 8,155,382 B2 | 4/2012 | Rubenstein | |
| 8,161,048 B2 | 4/2012 | Procopiuc et al. | |
| 8,199,982 B2 | 6/2012 | Fueyo et al. | |
| 8,234,285 B1* | 7/2012 | Cohen | 707/749 |
| 8,250,581 B1 | 8/2012 | Blanding | |
| 8,341,626 B1 | 12/2012 | Gardner et al. | |
| 8,447,273 B1 | 5/2013 | Friedlander et al. | |
| 2002/0184401 A1 | 12/2002 | Kadel et al. | |
| 2003/0065626 A1 | 4/2003 | Allen | |
| 2003/0149562 A1 | 8/2003 | Walther | |
| 2004/0111410 A1 | 6/2004 | Burgoon et al. | |
| 2004/0153461 A1 | 8/2004 | Brown et al. | |
| 2004/0162838 A1 | 8/2004 | Murayama et al. | |
| 2004/0249789 A1 | 12/2004 | Kapoor et al. | |
| 2005/0165866 A1 | 7/2005 | Bohannon et al. | |
| 2006/0004851 A1 | 1/2006 | Gold et al. | |
| 2006/0190195 A1 | 8/2006 | Watanabe et al. | |
| 2006/0271586 A1 | 11/2006 | Federighi et al. | |
| 2007/0006321 A1 | 1/2007 | Bantz et al. | |
| 2007/0016614 A1 | 1/2007 | Novy | |
| 2007/0073734 A1 | 3/2007 | Doan et al. | |
| 2007/0079356 A1 | 4/2007 | Grinstein | |
| 2007/0136048 A1 | 6/2007 | Richardson-Bunbury et al. | |
| 2007/0185850 A1 | 8/2007 | Walters et al. | |
| 2007/0282916 A1 | 12/2007 | Albahari et al. | |
| 2007/0300077 A1* | 12/2007 | Mani et al. | 713/186 |
| 2008/0065655 A1 | 3/2008 | Chakravarthy et al. | |
| 2008/0066175 A1 | 3/2008 | Dillaway et al. | |
| 2008/0086442 A1* | 4/2008 | Dasdan et al. | 707/1 |
| 2008/0091503 A1 | 4/2008 | Schirmer et al. | |
| 2008/0133474 A1* | 6/2008 | Hsiao et al. | 707/3 |
| 2008/0172715 A1 | 7/2008 | Geiger et al. | |
| 2008/0208813 A1 | 8/2008 | Friedlander et al. | |
| 2008/0208838 A1 | 8/2008 | Friedlander et al. | |
| 2008/0208901 A1 | 8/2008 | Friedlander et al. | |
| 2008/0281801 A1 | 11/2008 | Larson et al. | |
| 2008/0306926 A1 | 12/2008 | Friedlander et al. | |
| 2009/0024553 A1 | 1/2009 | Angell et al. | |
| 2009/0064300 A1 | 3/2009 | Bagepalli et al. | |
| 2009/0144609 A1 | 6/2009 | Liang et al. | |
| 2009/0164649 A1 | 6/2009 | Kawato | |
| 2009/0165110 A1 | 6/2009 | Becker et al. | |
| 2009/0287676 A1* | 11/2009 | Dasdan | 707/5 |
| 2009/0299988 A1 | 12/2009 | Hamilton, II et al. | |
| 2009/0327632 A1 | 12/2009 | Glaizel et al. | |
| 2010/0070640 A1 | 3/2010 | Allen et al. | |
| 2010/0088322 A1* | 4/2010 | Chowdhury et al. | 707/751 |
| 2010/0131293 A1 | 5/2010 | Linthicum et al. | |
| 2010/0179933 A1* | 7/2010 | Bai et al. | 706/12 |
| 2010/0191747 A1* | 7/2010 | Ji et al. | 707/750 |
| 2010/0241644 A1 | 9/2010 | Jackson et al. | |
| 2010/0257198 A1* | 10/2010 | Cohen et al. | 707/770 |
| 2010/0274785 A1 | 10/2010 | Procopiuc et al. | |
| 2011/0040724 A1 | 2/2011 | Dircz | |
| 2011/0066649 A1 | 3/2011 | Berlyant et al. | |
| 2011/0077048 A1* | 3/2011 | Busch | 455/556.1 |
| 2011/0087678 A1 | 4/2011 | Frieden et al. | |
| 2011/0123087 A1* | 5/2011 | Nie et al. | 382/132 |
| 2011/0137882 A1 | 6/2011 | Weerasinghe | |
| 2011/0194744 A1* | 8/2011 | Wang et al. | 382/131 |
| 2011/0208688 A1 | 8/2011 | Ivanov et al. | |
| 2011/0246483 A1 | 10/2011 | Darr et al. | |
| 2011/0246498 A1 | 10/2011 | Forster | |
| 2011/0282888 A1 | 11/2011 | Koperski et al. | |
| 2011/0301967 A1 | 12/2011 | Friedlander et al. | |
| 2011/0314155 A1 | 12/2011 | Narayanaswamy et al. | |
| 2012/0004891 A1 | 1/2012 | Rameau et al. | |
| 2012/0016715 A1 | 1/2012 | Brown et al. | |
| 2012/0023141 A1 | 1/2012 | Holster | |
| 2012/0079493 A1 | 3/2012 | Friedlander et al. | |
| 2012/0110004 A1 | 5/2012 | Meijer | |
| 2012/0131139 A1* | 5/2012 | Siripurapu et al. | 709/217 |
| 2012/0131468 A1 | 5/2012 | Friedlander et al. | |
| 2012/0191704 A1 | 7/2012 | Jones | |
| 2012/0209858 A1 | 8/2012 | Lamba et al. | |
| 2012/0221439 A1 | 8/2012 | Sundaresan et al. | |
| 2012/0233194 A1 | 9/2012 | Ohyu et al. | |
| 2012/0239761 A1 | 9/2012 | Linner et al. | |
| 2012/0240080 A1 | 9/2012 | O'Malley | |
| 2012/0246148 A1 | 9/2012 | Dror | |
| 2012/0259841 A1 | 10/2012 | Hsiao et al. | |
| 2012/0278897 A1 | 11/2012 | Ang et al. | |
| 2012/0281830 A1 | 11/2012 | Stewart et al. | |
| 2012/0297278 A1 | 11/2012 | Gattani et al. | |
| 2012/0311587 A1* | 12/2012 | Li et al. | 718/100 |
| 2012/0316821 A1 | 12/2012 | Levermore et al. | |
| 2012/0330958 A1* | 12/2012 | Xu et al. | 707/738 |
| 2013/0019084 A1 | 1/2013 | Orchard et al. | |
| 2013/0031302 A1 | 1/2013 | Byom et al. | |
| 2013/0060696 A1 | 3/2013 | Martin et al. | |
| 2013/0103389 A1 | 4/2013 | Gattani et al. | |
| 2013/0124564 A1* | 5/2013 | Oztekin et al. | 707/770 |
| 2013/0238667 A1 | 9/2013 | Carvalho et al. | |
| 2013/0291098 A1 | 10/2013 | Chung et al. | |
| 2014/0012884 A1 | 1/2014 | Bornea et al. | |
| 2014/0025702 A1 | 1/2014 | Curtiss et al. | |

OTHER PUBLICATIONS

P. Kanerva, "Hyperdimensional Computing: An Introduction to Computing in Distributed Representation With High-Dimensional Random Vectors", Springer Science+Business Media, LLC, Cogn Comput, 1, 2009, pp. 139-159.

P. Kanerva, "What We Mean When We Say "What'S the Dollar of Mexico?": Prototypes and Mapping in Concept Space", Quantum Informatics for Cognitive, Social, and Semantic Processes: Papers From the AAAI Fall Symposium, Association for the Advancement of Artificial Intelligence, 2010, pp. 2-6.

M. Yu, et al., "Secure and Robust Error Correction for Physical Unclonable Functions", Verifying Physical Trustworthiness of ICS and Systems, IEEE Design & Test of Computers, IEEE, Jan./Feb. 2010, pp. 48-64.

A. Jin, et al., "Biohashing: Two Factor Authentication Featuring Fingerprint Data and Tokenised Random Number," Pattern Recognition 37, Elsevier Ltd., 2004, pp. 2245-2255.

N. Saxena et al., "Data remanence effects on memory-based entropy collection for RFID systems", International Journal of Information Security 10.4 (2011), pp. 213-222.

A. Birrell et al., "A design for high-performance flash disks." ACM SIGOPS Operating Systems Review 41.2 (2007), pp. 88-93.

Richard Saling, "How to Give a Great Presentation! From the HP Learning Center", Jul. 28, 2008, <http://rsaling.wordpress.com/2008/07/28/how-to-give-a-great-presentation/>, pp. 1-28.

(56) References Cited

OTHER PUBLICATIONS

U.S. Appl. No. 13/342,305, Friedlander et al—Specification Filed Jan. 3, 2012.

K. Matterhorn, "How to Share Data Between a Host Computer & Virtual Machine," Ehow, pp. 1-3, <http://www.ehow.com/how_7385388_share-host-computer-virtual-machine.html>, Retrieved Feb. 17, 2013.

W. Caid et al., "Context Vector-Based Text Retrieval", Fair ISAAC Corporation, Aug. 2003, pp. 1-20.

Anonymous "Fraud Detection Using Data Analytics in the Banking Industry," ACL Services Ltd., 2010, pp. 1-9 <http://www.acl.com/pdfs/DP_Fraud_detection_BANKING.pdf>.

Visual Paradigm, "DB Visual Architect 4.0 Designer'S Guide: Chapter 6—Mapping Object Model to Data Model and Vice Versa", 2007, pp. 6-2-6-26.

Lorenzo Alberton, "Graphs in the Database: SQL Meets Social Networks," Techportal, Sep. 7, 2009, http://techportal.inviqa.com/2009/09/07/graphs-in-the-database-sql-meets-social-networks/, pp. 1-11.

Avinash Kaushik, "End of Dumb Tables in Web Analytics Tools! Hello: Weighted Sort", Sep. 7, 2010, www.kaushik.net, pp. 1-15.

Evaggelio Pitoura et al., "Context in Databases", University of Ioannina, Greece, 2004, pp. 1-19.

J. Cheng et al., "Context-Aware Object Connection Discovery in Large Graphs", Data Engineering, 2009. ICDE '09. IEEE 25th International Conference on, pp. 856-867.

R. Angles et al., "Survey of Graph Database Models", ACM Computing Surveys, Vol. 40, No. 1, Article 1, Feb. 2008, pp. 1-65.

U.S. Appl. No. 13/562,714, Robert R. Friedlander, et al.—Specification and Drawings Filed Jul. 31, 2012.

U.S. Appl. No. 13/592,905—Notice of Allowance Mailed Oct. 25, 2013.

U.S. Appl. No. 13/628,853—Non-Final Office Action Mailed Nov. 7, 2013.

U.S. Appl. No. 13/609,710—Non-Final Office Action Mailed Jan. 27, 2014.

U.S. Appl. No. 13/540,295—Non-Final Office Action Mailed Jan. 30, 2014.

U.S. Appl. No. 13/540,230—Non-Final Office Action Mailed Jan. 30, 2014.

U.S. Appl. No. 13/540,267—Non-Final Office Action Mailed Feb. 4, 2014.

U.S. Appl. No. 13/592,905—Non-Final Office Action Mailed May 8, 2013.

U.S. Appl. No. 13/610,347—Non-Final Office Action Mailed Jul. 19, 2013.

U.S. Appl. No. 13/610,347—Notice of Allowance Mailed Aug. 19, 2013.

Faulkner, Paul, "Common Patterns for Synthetic Events in Websphere Business Events," Jan. 15, 2011, http://www.ibm.com/developerworks/websphere/bpmjournal/1101_faulkner2/1101_faulkner2.html, pp. 1-10.

"Ninth New Collegiate Dictionary", Merriam-Webster Inc., 1991, pp. 77 and 242.

"The American Heritage College Dictionary", Fourth Edition, Houghton Mifflin Company, 2004, pp. 44 and 262.

U.S. Appl. No. 13/680,832—Non-Final Office Action Mailed Apr. 8, 2014.

U.S. Appl. No. 13/628,853—Notice of Allowance Mailed Mar. 4, 2014.

U.S. Appl. No. 13/595,356—Non-Final Office Action Mailed Apr. 14, 2014.

* cited by examiner

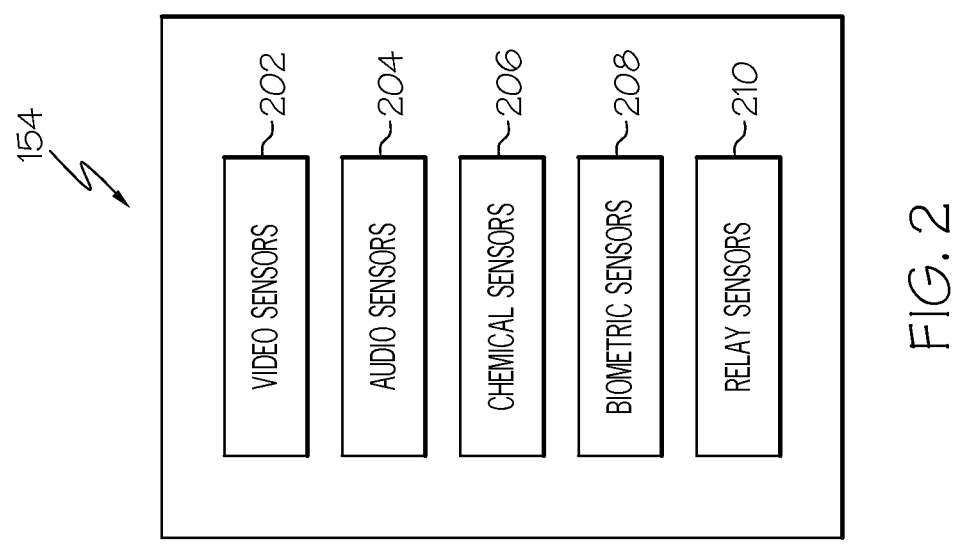

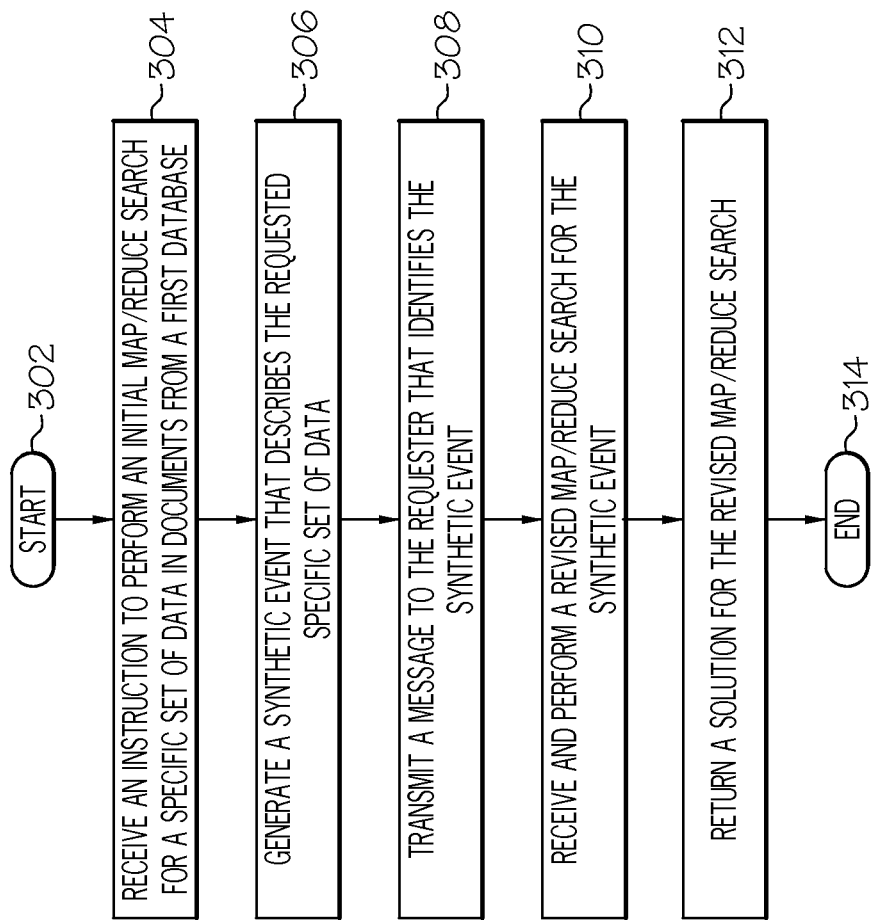

OPTIMIZING MAP/REDUCE SEARCHES BY USING SYNTHETIC EVENTS

BACKGROUND

The present disclosure relates to the field of computers, and specifically to the use of computers when searching for data in documents. Still more particularly, the present disclosure relates to the use of computers in searching for data in documents through the use of map/reduce search algorithms.

Documents, such as text documents, web pages, blogs, tweets, etc. hold data such as text, numbers, descriptions, etc. In order to search such documents for specific content, particularly when searching large volumes of heterogeneous data, techniques such as Map/Reduce are much more effective than older structured query language (SQL) or database searches. A main advantage of a Map/Reduce search is that it is very simple, since it only locates and counts occurrences of specific text/data units.

SUMMARY

A processor-implemented method, system, and/or computer program product optimizes a search for data from documents. A processor receives an instruction to perform an initial map/reduce search for a specific set of data in documents from a first database. A synthetic event, which is a non-executable descriptor of the specific set of data in documents from the first database, is generated, and a revised map/reduce search for the synthetic event in a second database is conducted. The processor then returns a solution for the revised map/reduce search.

BRIEF DESCRIPTION OF THE SEVERAL VIEWS OF THE DRAWINGS

FIG. 2 depicts exemplary sensors that may be used by the present invention; and FIG. 3 is a high level flow chart of one or more exemplary steps taken by a processor to perform a modified map/reduce search using a synthetic event.

DETAILED DESCRIPTION

Figure 1:
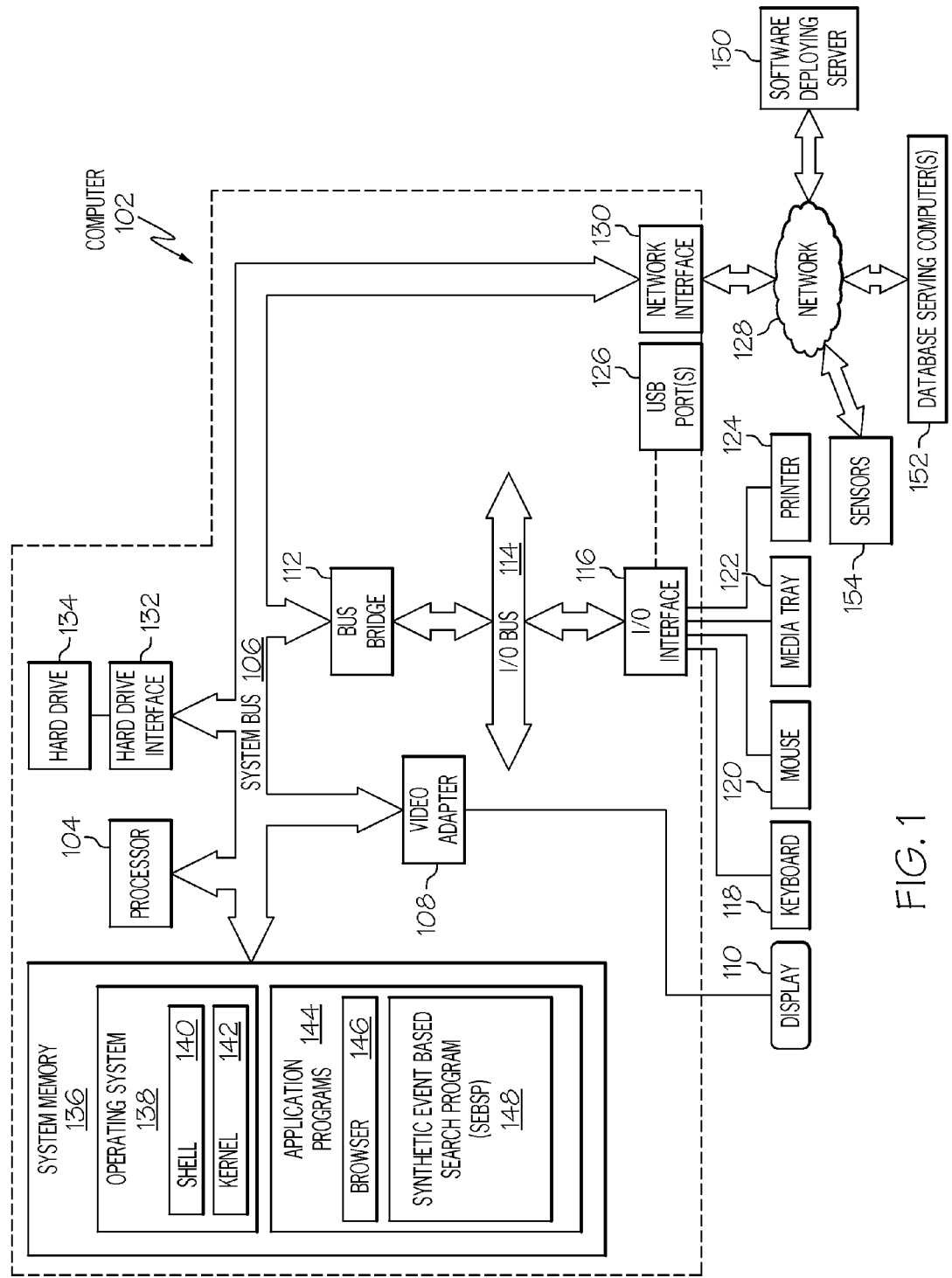
FIG. 1 depicts an exemplary system and network in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and in the implementation of the present invention. Note that some or all of the exemplary architecture, including both depicted hardware and software, shown for and within computer 102 may be utilized by software deploying server 150 and/or database serving computer(s) 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a printer 124, and external USB port (s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, as well as database serving computer(s) 152, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a synthetic event based search program (SEBSP) 148. SEBSP 148 includes code for implementing the processes described below, including those described in FIG. 3. In one embodiment, computer 102 is able to download SEBSP 148 from software deploying server 150, including in an on-demand basis, wherein the code in SEBSP 148 is not downloaded until needed for execution. Note further that, in one embodiment of the present invention, software deploying server 150 performs all of the functions associated with the present invention (including execution of SEBSP 148), thus freeing computer 102 from having to use its own internal computing resources to execute SEBSP 148.

Also coupled to computer 102, either directly or via network 128, are sensors 154. Sensors 154 are any type of physical sensors, including, but not limited to those depicted in FIG. 2. Thus, with reference to FIG. 2, a block diagram of exemplary sensors 154 that may be utilized in one or more embodiments of the present disclosure are presented.

Video sensors 202 include cameras, such as one of or a combination of a video camera for capturing moving images; a still camera for capturing still images; a web camera for capturing streaming images, etc. Video sensors 202 may be focally or remotely operated in order to pan, scan, activate, and otherwise control such cameras. As will all of the other sensors 154, video sensors 202 may be stationary or mobile.

Audio sensors 204 detect, capture, and/or record vibrations, such as pressure waves and sound waves being propagated through liquid, air or solids. Examples of audio sensors 204 include microphones, strain gauges, pressure switches, and any other device capable of detecting vibrations.

Chemical sensors 206 may be implemented as any type of known or available device that can detect airborne chemicals and/or airborne odor causing elements, molecules, gases, compounds, and/or combinations of molecules, elements, gases, and/or compounds in an air sample, such as, without limitation, an airborne chemical sensor, a gas detector, and/or an electronic nose. In one embodiment, chemical sensors 206 are implemented as an array of electronic olfactory sensors and a pattern recognition system that detects and recognizes odors and identifies olfactory patterns associated with different odor causing particles. The particles detected by chemical sensors 206 include, without limitation, atoms, molecules, elements, gases, compounds, or any type of airborne odor causing matter.

Biometric sensors 208 are devices that gather biometric data associated with a human or an animal. Biometric data is data describing a physiological state, physical attribute, or measurement of a physiological condition. Biometric data may include, without limitation, fingerprints, thumbprints, palm prints, footprints, heart rate, retinal patterns, iris patterns, pupil dilation, blood pressure, respiratory rate, body temperature, blood sugar levels, and any other physiological data. Biometric sensors 208 may include, without limitation, fingerprint scanners, palm scanners, thumb print scanners, retinal scanners, iris scanners, wireless blood pressure monitor, heart monitor, thermometer or other body temperature measurement device, blood sugar monitor, microphone capable of detecting heart beats and/or breath sounds, a breathalyzer, or any other type of biometric device.

Relay sensors 210 are devices for detecting and receiving signals from transmitting devices, which transmit signals that identify or otherwise describe physical objects and/or other devices. In one embodiment, the transmitting devices and relay sensors 210 communicate via a wireless personal area network (PAN), a wireless network connection, a radio transmitter, a cellular network, Wi-Fi technology, or any other wired or wireless system capable of transmitting and receiving data. Relay sensors 210 include, without limitation, radio frequency identification (RFID) tag readers, global positioning system (GPS) receivers, and identification code readers. The RFID tag readers read active and/or passive RFID tags in a device, object, name tag, etc. The GPS receivers are located in an object, such as a car, a portable navigation system, a personal digital assistant (PDA), a cellular telephone, or any other type of object. Examples of identification code readers are, without limitation, a bar code reader, a dot code reader, a universal product code (UPC) reader, an optical character recognition (OCR) text reader, or any other type of identification code reader.

With reference again to FIG. 1, the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Map/Reduce is a data search routine that is used to search for and quantify data located in very large volumes of data. As the name implies, there are two functions in a map/reduce routine. The map function reads data incidents (e.g., each word in a text document) from a set of one or more documents (e.g., text documents, web pages, e-mails, text messages, tweets, etc.), and then maps those data incidents to a set of dynamically generated intermediate pairs (identifier, quantity). These intermediate pairs of mapped data are then sent to a reduce function, which recursively operates on the intermediate pairs to generate a value that indicates how many times each data incident occurred in all of the searched documents.

Referring now to FIG. 3, a high level flow chart of one or more exemplary steps taken by a processor to optimize a search for data from documents is presented. As used herein, a document is defined as any file or collection of data. Examples of such files/data collections include, but are not limited to, text based documents, image files, audio files, and outputs from sensors. Examples of text based documents include, but are not limited to, text files, blogs, tweets, e-mail messages, web pages, instant messages, etc. Examples of image files include, but are not limited to, still digital photograph files (e.g., JPEG files), video (moving) image files (e.g., MPEG files), scanned image files (e.g., PDF files), etc. Examples of audio files include, but are not limited to, audio recordings (e.g., WAV files, MP3 files, VOX files, etc.) generated from a microphone or other sound capturing device. Examples of outputs from sensors include (preferably digitized) outputs from any sensor, including, but not limited to sensors 154 depicted in FIGS. 1-2 above.

With reference still to FIG. 3, after initiator block 302, an instruction is received from a requester to perform an initial map/reduce search for a specific set of data located in documents from a first database (block 304). For example, assume that a first database contains one or more documents, and that the requester wants to know how many occurrences there are of a particular word, value, image, etc. in these documents. Fulfilling such a request may be prohibitively time consuming and/or expensive if a traditional map/reduce protocol is used, as requested. Therefore, as described in block 306, a synthetic event is responsively generated. This synthetic event is a non-executable descriptor of the specific set of data that was requested to be searched in documents from the first database. In one embodiment, the synthetic event is stored in a second database that is different from the first database. That is, the first database holds the primary data that was to be searched by the initial map/reduce search request, and the second database holds the synthetic events that are generated based on the initial map/reduce search request.

For example, assume that the initial map/reduce search request is to locate and count how often a set of words A, B, and C (i.e., a combination of all of the words A, B, and C) occur in each document in the first database. The synthetic event is the occurrence of all of the words A, B, and C being in one or more documents. This particular synthetic event is given a unique identifier (e.g., SE1). As described in block 308, a message is then transmitted to the requester. This message identifies the synthetic event (i.e., SE1) in the second database that describes the specific set of data (which was the subject of the initial map/reduce search request) located in the documents from the first database. As described in block 310, a subsequent request is then received to perform a revised map/reduce search for the synthetic event (e.g., SE1) in the second database. That is, the requester now knows that, rather than taking up the time and resources required to perform the initial map/reduce search for the combination of words A, B, and C in the primary first database, a faster search is made by simply asking for a revised map/reduce search, which determines how many SE1 files are in the second database. The search for incidents of SE1 files in the second database is performed by executing the revised map/reduce search, and a solution (i.e., how many SE1 files are identified) is returned to the requester (block 312). The process ends at terminator block 314.

The present invention allows not only the original requester of the initial map/reduce search to be apprised of the corresponding synthetic event, but other requesters and database managers as well. Thus, whenever anyone wants to know how often all of the words A, B, and C occur in documents in a primary database, if they know about SE1, they will simply request a map/reduce search for SE1 in a secondary database of synthetic events, assuming that the manager of the primary and secondary databases being searched has proactively generated the SE1 file and stored it in his secondary database.

As described herein, one embodiment assumes that a synthetic event describes an exact match of requested sets of data (i.e., synthetic event SE1 is generated only if all of the words A, B, and C are identified in the primary database). In another embodiment, however, probability is used to determine the likelihood that all of the words A, B, and C are located in the primary database if some other condition exists (e.g., the combination of words A and B have already been located in the primary database). For example, assume that H represents the hypothesis that one of the synthetic events described above will be supported (e.g., words A, B, and C all exist within at least one document in the primary database), and D represents that the same synthetic event will occur whenever words A and B are both within the primary database. This results in the Bayesian probability formula of:

$$P(H|D) = \frac{P(D|H) * P(H)}{P(D)}$$

where:

P(H|D) is the probability that the synthetic event will be supported by words A, B, and C all occurring together within the primary database given (|) the likelihood (D) of the same synthetic event being supported if words A and B occur together within the primary database;

P(D|H) is the probability that the primary database contains the word C whenever the same primary database also contains words A and B;

P(H) is the probability that the synthetic event will be supported by words A, B, and C being in the primary database, regardless of any other conditions; and P(D) is the probability that the synthetic event will be supported whenever there is a presence of words A and B in the primary database, regardless of any other conditions.

For example, assume that past studies have shown that the synthetic event SE1 is supported by the primary database 20% of the time (P(H)=20%), regardless of any other conditions. Assume further that the probability that the synthetic event will be supported by the primary database whenever words A and B are located within the primary database, regardless of any other conditions, is 50% (P(D) is 50%). Finally, assume that past studies have shown that probability that the primary database contains the word C whenever the same primary database also contains words A and B is 30% (P(D|H)=30%). According to these values, the probability that the synthetic event will be supported by the first set of data bases is therefore 12%:

$$P(H|D) = \frac{.30 * .20}{.50} = .12$$

In this first scenario, there is not enough support for the manager of the primary/secondary databases to map/reduce search the primary database, in order to proactively generate a synthetic event SE1 for storage in the secondary database, since it is unlikely that word C will also be in the primary database.

However, if past studies have shown that the synthetic event SE1 is supported by the primary database 55% of the time (P(H)=55%), regardless of any other factors, and that the synthetic event will be supported by word C in the primary database whenever the primary database contains words A and B 90% of the time (P(D|H)=90%), then the probability that the synthetic event will be supported by the first set of data bases is therefore 99%:

$$P(H|D) = \frac{.90 * .55}{.50} = .99$$

In this second scenario, it is worthwhile to assume that the primary database will support SE1 whenever words A and B are identified in the primary database, and thus it will be worthwhile for the database manager to proactively perform the requisite map/reduce searches of the primary database in order to generate the synthetic event SE1 for storage in the second database.

While the present invention has been described in exemplary manner by searching for incidents of words in documents, the process and use of map/reduce searches is applicable to other scenarios. For example, assume that documents in the primary database (first database) are image files. Image files are files that, when processed, cause images to be rendered on a display. Such image files may be MPEG (Moving Picture Experts Group) files, JPEG (Joint Photographic Experts Group) files, TIFF (Tagged Image File Format) files, DICOM (Digital Imaging and Communications in Medicine, a medical image file format), FITS (Flexible Image Transport System, used for astronomy images), etc. In one embodiment under this scenario, the synthetic event is described in a non-executable document/file, such as a text document, database, etc., that describes visual attributes of the image when rendered on the display. These visual attributes may be simple (e.g., describe a geometric shape such as a circle, a square, etc.), moderately complex (e.g., describe the shading, dimensions, etc. of the objects), or very complex (e.g., describe phenotypic descriptions of the objects, such as describing a cell as "cancerous", describing a bone as "fractured and showing loss of calcification", describing a growth as "a malignant tumor between 3-5 cm located within the occipital lobe of the brain", etc.). In this scenario, when a searcher is looking for an image (e.g., from a CT-scan, an MRI, etc.) that meets certain criteria ("a 3-5 cm brain tumor"), a search will be made on the secondary database (containing the synthetic events) rather than the primary database that contains the image files.

Continuing with the scenario in which the documents in the first database are image files, and the synthetic event is described in a non-executable file (e.g., a text document containing words that are not executable as instructions by a processor), in one embodiment the non-executable file describes physical attributes of objects depicted by the image rendered by the image files. That is, rather than the non-executable file simply describing the shape/color/etc. of a displayed image (as discussed above), in this embodiment the attributes of a real/physical object itself, which is depicted in an image, are described in the non-executable file. For example, assume that an image file is for a gear from a transmission. The non-executable file will contain not only information about the size and shape of the gear, but also information about what type of steel it is made of, how hard the steel is, what the tensile/breaking strength of the teeth in the gear is, etc. In one embodiment, this information is derived from data (e.g., metadata) found in the image file. This data/metadata may be initially retrieved from the designer/producer of the image files, who will have access to such information from the manufacturer, etc.

In another embodiment in which the documents in the first database are image files, and the synthetic event is described in a text document or other non-executable file, the image files are of an anatomical object. This anatomical object may be a healthy object, such as a healed scar, a healed ulcer, etc., or it may be a diseased object, such as a tumor, a ruptured disk, etc. In either scenario, there is a reason/cause for the condition/existence of the anatomical object. That is, the healed ulcer may be the result of a particular regimen of medication and other medical treatment. The ruptured disk may be the result of a fractured vertebra. All such information about the object being imaged is pre-retrieved from medical records, radiology reports, etc., and associated (via a lookup table, metatags to the file, etc.) with the documents/image files.

Just as the documents in the first database may be video/image files, in one embodiment some or all of such documents are audio files, which are a record of an audio event (e.g., a voice recording, a sonar recording, a vibration recording of machinery vibrations, etc.). In this scenario, the synthetic event is represented/described in a text document (or other non-executable file) that describes the event itself, and/or describes a source of the audio event. For example, assume that the audio file is a sound recording of a running electric motor, whose rotor is out of balance and/or whose bearings are worn out. The synthetic event is "running an electric motor whose rotor is out of balance and whose bearings are worn out." The text file describes this event, either in whole or in part. That is, the text file may describe the event simply as sound created by an electric motor running ("the audio event"). In another embodiment, the text file may (also) describe a cause of the audio event (e.g., "the rotor is out of balance and the bearings are worn out").

In one embodiment, the documents in the first database are disparately formatted. For example, some of the documents in the first database may be text files, while others are image files, while others are physical sensor output files (e.g., recordings of the output of physical sensors such as those described in FIG. 2), etc. However, all of these disparately formatted documents describe a same event. For example, a text file may be a report of a poorly running electric motor, image files may be a video of the poorly running electric motor, audio files may be of a sound recording of the poorly running electric motor, physical sensor output files may be recordings of vibration/heat/pressure sensors on the poorly running electric motor, etc. As such, multiple map/reduce searches would be required using traditional map/request algorithms to locate and quantify how often a certain set of specified conditions (e.g., an electric motor runs loudly, wobbles, vibrates too much, and runs too hot) occur. However, a dynamically generated text document (non-executable file) that describes the searched-for parameters (e.g., a certain type of motor, showing vibrations within a certain range, having an internal pressure reading between a specific range, having an internal temperature within a predefined range, etc.) is quickly identified by searching for the synthetic event (in which these parameters are met) in the secondary database as described herein.

In one embodiment, the documents from the first database describe a same type of physical attribute using different scales. In this embodiment, in which the synthetic event is described as a text document (or other non-executable file), the text document harmonizes the different scales into a same scale. For example, assume that the synthetic event is for a 35-year-old patient having a temperature of 101° F. Some of the documents in the first database may describe 35-year-old patients with a temperature of 101° F., while others will describe the same or other 35-year-old patients with a temperature of 38.3° C., which is the same as 101° F. However, a traditional map/reduce algorithm would have to run two searches, one for Fahrenheit and one for Celsius. Using a single map/reduce search of the synthetic events described in the second database overcomes this inefficiency.

As noted herein, the basis of some of the information found in documents in the first database comes from physical sensors, such as those described in FIG. 2. Thus, outputs from those physical sensors (i.e., "physical readings") are stored as physical sensor output files. These physical readings describe a physical event, which has the same attributes as the synthetic event. That is, the physical event has a first set of attributes (e.g., electric motor running, rotor out of balance, bearings worn out) that is the same as a second set of attributes (e.g., electric motor running, rotor out of balance, bearings worn out) ascribed to a particular synthetic event. The synthetic event may be further described in a non-executable file (e.g., a text document or other file that cannot be executed as instructions in a computer program) in the secondary database.

In one embodiment of the present invention, the synthetic event is generated in response to a predefined secondary event occurring. This predefined secondary event is a physical event being performed by an observed subject of at least one physical sensor, and thus leads to the synthetic event being described in a non-executable file (e.g., a text document or other file that cannot be executed as instructions in a computer program) that describes the physical activity being performed by the observed subject. For example, assume that an electric motor is running normally until one of its bearings seizes up ("a predefined secondary event occurring"). A vibration/heat sensor on the electric motor will output sensor readings that are indicative of such an event. The synthetic event is then generated (i.e., "sensors on an electric motor generate heat and vibration readings of a certain range when one of its bearings seizes up"). Thereafter, when a map/reduce search request is received to search for vibration/heat data within this range for electric motors, a processor will redirect the search request to the second database of synthetic events, which now include at least one synthetic event text document having these features. Note that in one embodiment, the processor "knows" to redirect the initial map/reduce search to the revised map/reduce search by mapping the initial map/reduce search to the revised map/reduce search. That is, if the initial map/reduce search is looking for incidents of electric motors having certain vibration/heat readings, these certain vibration/heat readings are used to map/correlate the initial map/reduce search to the appropriate synthetic event, which can be retrieved by the revised map/reduce search.

In one embodiment, the synthetic event is limited to correspond to a predetermined period of time from when the instruction to perform the initial map/reduce search was received. For example, assume that the initial map/reduce search request for data/parameters that are described in the first (primary) database is received at time $T_o$. Assume further that a first synthetic event (and/or its corresponding text document) that described these data/parameters was generated at the time that the initial map/reduce search was being received/performed. Unfortunately, the same named data/parameters (e.g., a current age of the patient) are no longer valid after a year. That is, assume that a subsequent map/reduce search request is looking for 35-year-old patients. The text document (or other type of non-executable file) describing the original synthetic event will correctly state that there was a 35-year-old patient that met the particular parameters. However, if a second map/reduce search request to search the primary data is received a year later, then the rerouting of the request to the revised map/reduce search will locate a synthetic event that indicates that there is currently a 35-year-old patient the meets the particular parameters, which is incorrect, since that patient is now 36 years old. Thus, the synthetic event (and/or its corresponding text document) has a shelf life of less than a year (e.g., a predetermined period of time from when the instruction to perform the initial map/reduce search was received) when describing current events.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A processor-implemented method of optimizing a search for data from documents, the processor-implemented method comprising:
    a processor receiving an instruction from a requester to perform an initial map/reduce search for a specific combination of data located in each document from a first database;
    the processor generating a synthetic event, wherein the synthetic event is a non-executable descriptor of the specific combination of data that is located in documents from the first database, and wherein the synthetic event is stored in a second database;
    the processor transmitting a message to the requester, wherein the message identifies the synthetic event in the second database that describes the specific combination of data located in the documents from the first database;
    the processor generating a copy of the synthetic event for each document, in the first database, that contains the specific combination of data;
    the processor generating a synthetic event count of how many copies of the synthetic event are stored in the second database;
    the processor receiving and performing a revised map/reduce search for the synthetic event in the second database, wherein the revised map/reduce search determines how many copies of the synthetic event are stored in the second database; and
    the processor returning a solution for the revised map/reduce search, wherein the solution describes the synthetic event count of the copies of the synthetic event found in the second database.

2. The processor-implemented method of claim 1, wherein documents in the first database are image files, wherein processing the image files causes an image to be rendered on a display, and wherein the processor-implemented method further comprises:
    the processor describing the synthetic event in a non-executable file, wherein the non-executable file describes visual attributes of the image rendered on the display.

3. The processor-implemented method of claim 1, wherein documents in the first database are image files, wherein processing the image files causes an image to be rendered on a display, and wherein the processor-implemented method further comprises:
    the processor describing the synthetic event in a non-executable file, wherein the non-executable file describes physical attributes of objects depicted by the image rendered on the display.

4. The processor-implemented method of claim 1, wherein documents in the first database are medical image files, wherein processing the medical image files causes an image of an anatomical object to be rendered on a display, and wherein the processor-implemented method further comprises:
    the processor retrieving, from medical records, clinical information related to the medical image files; and
    the processor describing the synthetic event in a non-executable file, wherein the non-executable file describes, based on the clinical information, a medical cause of a condition of the anatomical object that is depicted on the display.

5. The processor-implemented method of claim 1, wherein documents in the first database are audio files, wherein the audio files are a record of an audio event, and wherein the processor-implemented method further comprises:
    the processor describing the synthetic event in a non-executable file, wherein the non-executable file describes the audio event.

6. The processor-implemented method of claim 1, wherein documents in the first database are audio files, wherein the audio files are a record of an audio event, and wherein the processor-implemented method further comprises:
    the processor describing the synthetic event in a non-executable file, wherein the non-executable file describes a cause of the audio event.

7. The processor-implemented method of claim 1, wherein documents in the first database are disparately formatted files that all describe a same physical event, and wherein the processor-implemented method further comprises:

the processor describing the synthetic event in a non-executable file, wherein the non-executable file describes the same physical event.

8. The processor-implemented method of claim 7, wherein the disparately formatted files comprise a text file, an image file, and a physical sensor output file.

9. The processor-implemented method of claim 1, wherein documents from the first database describe a same type of physical attribute using different scales, and wherein the processor-implemented method further comprises:
the processor describing the synthetic event in a non-executable file, wherein the non-executable file harmonizes the different scales into a same scale.

10. The processor-implemented method of claim 1, further comprising:
the processor receiving physical readings from at least one physical sensor, wherein said physical readings describe a physical event, and wherein said physical event and said synthetic event are described by a same set of attributes; and
the processor describing the synthetic event in a document.

11. The processor-implemented method of claim 1, further comprising:
the processor generating the synthetic event in response to a predefined secondary event occurring, wherein the predefined secondary event is a physical activity being performed by an observed subject of at least one physical sensor, and wherein the synthetic event is described in a non-executable file that describes the physical activity being performed by the observed subject.

12. The processor-implemented method of claim 1, further comprising:
the processor limiting the synthetic event to correspond to a predetermined period of time from when the instruction to perform the initial map/reduce search was received.

13. A computer program product for optimizing a search for data from documents, the computer program product comprising:
a non-transitory computer readable storage media;
first program instructions to receive an instruction from a requester to perform an initial map/reduce search for a specific combination of data located in each document from a first database;
second program instructions to generate a synthetic event, wherein the synthetic event is a non-executable descriptor of the specific combination of data that is located in documents from the first database, and wherein the synthetic event is stored in a second database;
third program instructions to transmit a message to the requester, wherein the message identifies the synthetic event in the second database that describes the specific combination of data located in the documents from the first database;
fourth program instructions to generate a copy of the synthetic event for each document, in the first database, that contains the specific combination of data;
fifth program instructions to generate a synthetic event count of how many copies of the synthetic event are stored in the second database;
sixth program instructions to receive and perform a revised map/reduce search for the synthetic event in the second database, wherein the revised map/reduce search determines how many copies of the synthetic event are stored in the second database; and
seventh program instructions to return a solution for the revised map/reduce search, wherein the solution describes the synthetic event count of the copies of the synthetic event found in the second database; and
wherein the first, second, third, fourth, fifth, sixth, and seventh program instructions are stored on the non-transitory computer readable storage media.

14. The computer program product of claim 13, further comprising:
eighth program instructions to generate the synthetic event in response to a predefined secondary event occurring, wherein the predefined secondary event is a physical activity being performed by an observed subject of at least one physical sensor, and wherein the synthetic event is described in a non-executable file that describes the physical activity being performed by the observed subject; and
wherein the eighth program instructions are stored on the non-transitory computer readable storage media.

15. The computer program product of claim 13, wherein documents in the first database are image files, wherein processing the image files causes an image to be rendered on a display, and wherein the computer program product further comprises:
eighth program instructions to describe the synthetic event in a non-executable file, wherein the non-executable file describes physical attributes of the image rendered on the display; and
wherein the eighth program instructions are stored on the non-transitory computer readable storage media.

16. The computer program product of claim 13, further comprising:
eighth program instructions to receive physical readings from at least one physical sensor, wherein said physical readings describes a physical event, and wherein said physical event and said synthetic event are described by a same set of attributes; and
ninth program instructions to describe the synthetic event in a non-executable file; and wherein the eighth and ninth program instructions are stored on the non-transitory computer readable storage media.

17. A computer system comprising:
a central processing unit (CPU), a computer readable memory, and a computer readable storage media;
first program instructions to receive an instruction from a requester to perform an initial map/reduce search for a specific combination of data located in each document from a first database;
second program instructions to generate a synthetic event, wherein the synthetic event is a non-executable descriptor of the specific combination of data that is located in documents from the first database, and wherein the synthetic event is stored in a second database;
third program instructions to transmit a message to the requester, wherein the message identifies the synthetic event in the second database that describes the specific combination of data located in the documents from the first database;
fourth program instructions to generate a copy of the synthetic event for each document, in the first database, that contains the specific combination of data;
fifth program instructions to generate a synthetic event count of how many copies of the synthetic event are stored in the second database;
sixth program instructions to receive and perform a revised map/reduce search for the synthetic event in the second database, wherein the revised map/reduce search determines how many copies of the synthetic event are stored in the second database; and seventh program instructions to return a solution for the revised map/reduce search, wherein the solution describes the synthetic event count of the copies of the synthetic event found in the second database; and wherein the first, second, third, fourth, fifth, sixth, and seventh program instructions are stored on the computer readable storage media for execution by the CPU via the computer readable memory.

18. The computer system of claim 17, further comprising: eighth program instructions to generate the synthetic event in response to a predefined secondary event occurring, wherein the predefined secondary event is a physical activity being performed by an observed subject of at least one physical sensor, and wherein the synthetic event is described in a non-executable file that describes the physical activity being performed by the observed subject; and wherein the eighth program instructions are stored on the computer readable storage media for execution by the CPU via the computer readable memory.

19. The computer system of claim 17, wherein documents in the first database are image files, wherein processing the image files causes an image to be rendered on a display, and wherein the computer system further comprises:

eighth program instructions to describe the synthetic event in a non-executable file, wherein the non-executable file describes physical attributes of the image rendered on the display; and wherein the eighth program instructions are stored on the computer readable storage media for execution by the CPU via the computer readable memory.

20. The processor-implemented method of claim 1, wherein the specific combination of data comprises a combination of words described as word A, word B, and word C, and wherein the processor-implemented method further comprises:

the processor determining a likelihood of the specific combination of data being located in the first database based on a Bayesian probability formula of:

$$P(H|D) = \frac{P(D|H) * P(H)}{P(D)}$$

wherein H represents a hypothesis that at least one copy of said synthetic event will be supported by the specific combination of data existing within at least one document in the first database, wherein P(H|D) is a probability that the synthetic event will be supported by words A, B, and C all occurring together within the primary database given (|) a likelihood (D) of words A and B occurring together within the first database; wherein P(D|H) is a probability that the first database contains the word C whenever the first database also contains the words A and B; wherein P(H) is a probability that the synthetic event will be supported by words A, B, and C being in the primary database, regardless of any other conditions; and wherein P(D) is a probability that the synthetic event will be supported whenever there is a presence of words A and B in the first database, regardless of any other conditions.

* * * * *